US007146475B2

(12) United States Patent
Perego

(10) Patent No.: US 7,146,475 B2
(45) Date of Patent: Dec. 5, 2006

(54) DATA SET LEVEL MIRRORING TO ACCOMPLISH A VOLUME MERGE/MIGRATE IN A DIGITAL DATA STORAGE SYSTEM

(75) Inventor: Robert M. Perego, Seattle, WA (US)

(73) Assignee: Mainstar Software Corporation, Bellevue, WA (US)

( * ) Notice: Subject to any disclaimer, the term of this patent is extended or adjusted under 35 U.S.C. 154(b) by 304 days.

(21) Appl. No.: 10/717,199

(22) Filed: Nov. 18, 2003

(65) Prior Publication Data
US 2005/0108485 A1 May 19, 2005

(51) Int. Cl.
G06F 12/16 (2006.01)
(52) U.S. Cl. ............... 711/162; 711/112; 711/161; 707/204
(58) Field of Classification Search ............... None
See application file for complete search history.

(56) References Cited

U.S. PATENT DOCUMENTS

| | | | | |
|---|---|---|---|---|
| 5,515,502 | A | 5/1996 | Wood | 395/182.13 |
| 5,649,152 | A | 7/1997 | Ohran et al. | 395/411 |
| 5,680,640 | A | 10/1997 | Ofek et al. | 395/839 |
| 5,915,264 | A | 6/1999 | White et al. | 711/168 |
| 6,076,148 | A * | 6/2000 | Kedem | 711/162 |
| 6,145,066 | A | 11/2000 | Atkin | 711/165 |
| 6,366,987 | B1 * | 4/2002 | Tzelnic et al. | 711/162 |
| 6,578,120 | B1 * | 6/2003 | Crockett et al. | 711/162 |
| 6,598,037 | B1 * | 7/2003 | Craig et al. | 707/1 |
| 6,772,303 | B1 * | 8/2004 | Crockett et al. | 711/162 |
| 2001/0010070 | A1 | 7/2001 | Crockett et al. | 711/162 |
| 2003/0177322 | A1 * | 9/2003 | Crockett et al. | 711/161 |

FOREIGN PATENT DOCUMENTS

| | | |
|---|---|---|
| EP | 1 065 585 | 1/2001 |
| EP | 1065585 | 1/2001 |

OTHER PUBLICATIONS

International Search Report and Written Opinion for PCT/US2004/034934, issued Mar. 7, 2005.
"Hitachi Freedom Storage 7700, Hitachi Remote Copy, and FDR InstantBackup at Orange and Rockland Utilities, Inc.," by Roselinda R. Schulman and James R. Sottile. Copyright 1999 by Hitachi Data Systems Corporation.
Softek TDMF Mainframe Edition brochure. Published on the Internet at www.softek.fujitsu.com. Copyright 2003 by Fujitsu Software Technology Corporation.

* cited by examiner

Primary Examiner—Reginald Bragdon
Assistant Examiner—Daniel Ko
(74) Attorney, Agent, or Firm—Stoel Rives LLP

(57) ABSTRACT

Users of Mainframe computers running under IBM's MVS operating systems have a need to merge migrate data from multiple smaller DASD devices (disk volumes) to larger DASD devices, and/or to migrate data in order to combine data set extents. A method is disclosed for migrating data where a volume merge is involved, and/or when combining of extents is desired, that minimizes the down time of applications using the involved data while satisfying MVS rules for volume and catalog meta-data files as well as data extent limitations. The method may be implemented such that source and target volumes need not be in like manufacturer DASD devices.

55 Claims, 2 Drawing Sheets

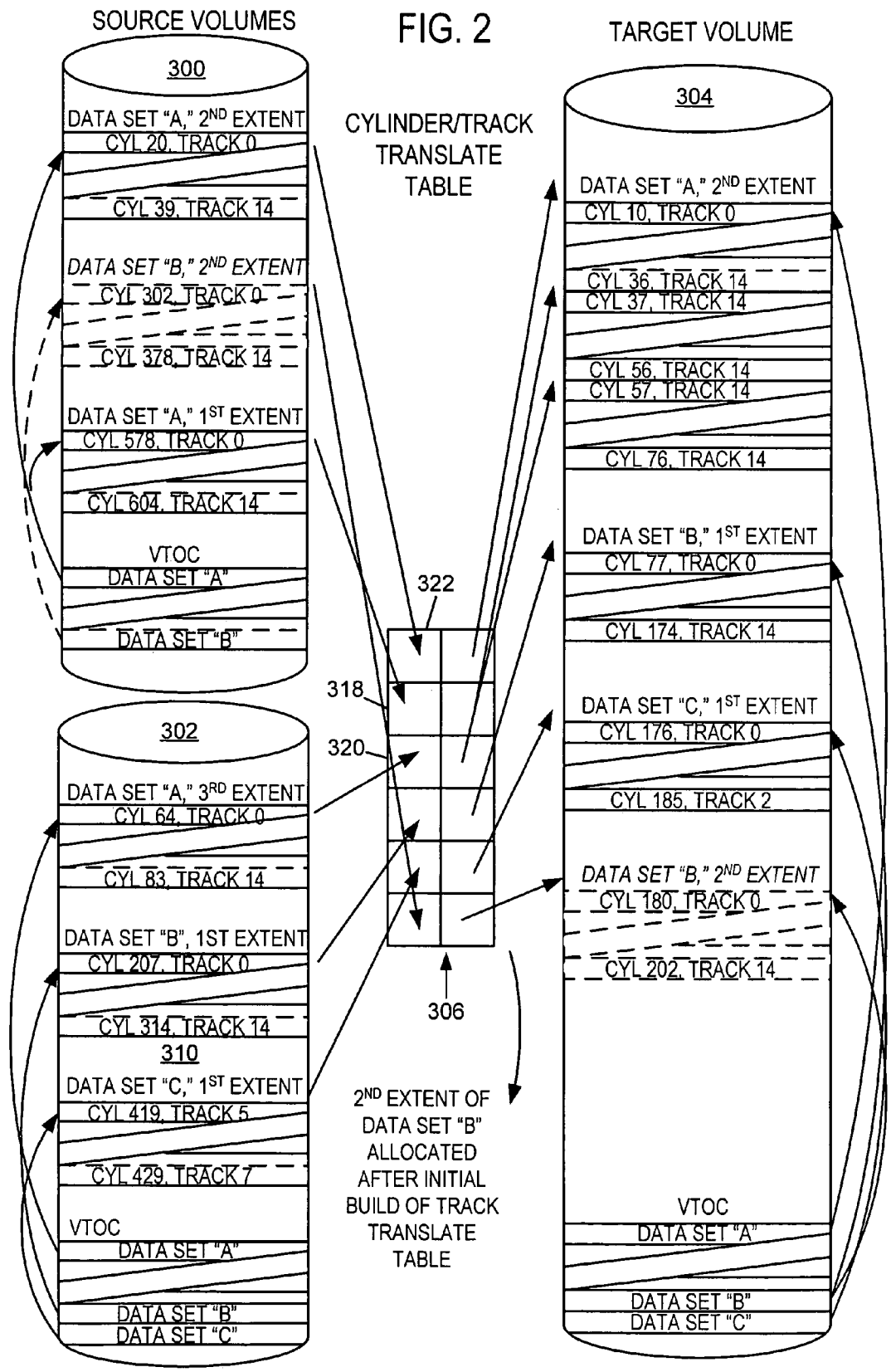

DATA SET LEVEL MIRRORING TO ACCOMPLISH A VOLUME MERGE/MIGRATE IN A DIGITAL DATA STORAGE SYSTEM

COPYRIGHT NOTICE

© 2003 Mainstar Software Corporation. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

The invention pertains to digital data storage; more particularly it pertains to management, merging, migration and backup of data or "data sets" stored in DASD (Direct Access Storage Device) volumes, especially data sets used in high-availability production environments.

BACKGROUND OF THE INVENTION

Advances in technology have increased the capacities of DASD devices (popularly known as "disk drives" or "hard drives") and continue to do so. Users often wish to utilize larger devices by "migrating" or moving data to them from existing smaller devices.

A DASD device may contain one or more "volumes" as further discussed below. Use of larger DASD volumes is desirable for a number of reasons, a critical one being to solve the problem of exceeding the maximum number of devices that can be attached to a processor. To take advantage of larger volumes users may need to populate them by merging existing data from smaller volumes. The term "merge" refers to combining data from multiple source volumes to a fewer number of target or destination volumes. Thus we will refer to a "merge/migrate" operation to mean moving data from at least one source volume to at least one destination volume, including merging at least some of the moved data.

Migration of data from smaller to larger storage devices can be accomplished using IBM or other vendor supplied utility programs, but because of the way most mainframe programs access data sets stored on DASD devices, the applications using the involved data sets must be quiesced for the duration of the migration process. The term "quiesced" here means that the application program cannot access the data sets being migrated; the data sets are closed. This creates a hardship for applications whose accessibility requirements do not allow for significant down time. Downtime is defined as the time between closing and re-opening of application data sets. For example, many enterprises maintain Internet access portals that require access to data storage systems. Accordingly, the data storage systems must be available 24/7 or as nearly so as is practicable; the present invention helps to address this challenge.

Mainframe files or "data sets," for example under MVS operating systems, are allocated space on DASD devices in one or more contiguous groups of tracks. (A typical DASD device has 15 tracks per cylinder.) Each contiguous group is called an "extent." The number of permissible extents for a data set varies by type of data set, level of the OS, and other factors, but generally some fixed limitation is imposed. A data set can span more than one volume, although an individual extent must be stored in a single volume. This presents two common problems: a) a data set cannot expand because the maximum number of extents has been reached (even though DASD space is available), and b) due to space available at the time an extent was needed, a data set may be spread over more volumes than the user would like.

Copying and/or re-allocating a data set to address these problems is complicated by several factors. Programs accessing data running under the MVS operating system expect all records of a file to be in the locations on DASD found at the time a file is "opened." If a copy is in progress, the common input/output mechanisms used to read or write records cannot deal with an in-flight copy, i.e., accessing a record in either a source or target location based on which records have been moved at any point in time. Consequently, applications typically must be stopped while data used by the applications is being moved. Moving data takes time, exacerbated by two trends: a huge growth in the amount of data stored, and an increase in the number of hours per day of desired availability, often 24/7.

Moreover, buffering causes an integrity problem when moving data. A record may be "logically" written by a program but due to buffering techniques may not actually be written to DASD until some circumstance causes the buffer to be flushed to the DASD device. Consequently, the source in a physical copy may not represent logically what the source should represent at any given point in time. The problem is normally solved by making sure any files are closed before a copy is initiated. Closing a file forces writes to DASD of any outstanding buffers.

Finally, switching access to the target of a move (the new data location) is complicated by the fact that programs running under MVS operating systems copy into memory the physical locations of a file's extents once at "open" time. Even if the point-in-time consistency and buffering problems are solved, changing the in-memory information about where the extents of a file are located without requiring programs to close and reopen would be extremely difficult.

Because of these problems a user needing to merge data from smaller to larger volumes, or copy a data set to combine extents, using conventional and available solutions, must stop all applications accessing the data involved for the duration of the copy. The time to copy requires the application(s) be quiesced for a time frame often unacceptable for the up-time requirements of the application. The majority of time consumed when using conventional means to merge data sets from multiple source volumes to fewer target volumes comprises: 1) physical copy time, 2) target data set allocation time, and 3) time to re-catalog target data sets.

A catalog in this context is a data set that keeps track of where other data sets are located. It is somewhat similar to a directory on a PC. A data set on a given volume can be accessed without it being cataloged, but the user would have to know and specify exactly what volume it's on. The primary purpose of a catalog is that it enables locating data sets without knowledge of what volume they are stored in; a catalogued data set can be located and accessed by name.

Additionally a volume merge functionality must be accomplished with an awareness of volume content due to the MVS data management rules. DASD devices used under MVS operating systems must contain a VTOC (Volume Table Of Contents), and optionally a VTOCIX (VTOC Index) and VVDS (VSAM Volume Data Set). (VSAM stands for virtual storage access method.) Only one each of these meta-data files may exist per volume. Consequently, a volume merge functionality must include merging data from multiple source meta-data files into single target meta-data files. This requirement eliminates any solution that has no awareness of the data being copied.

For a volume merge methodology to be practical, it must also adhere to the data set extent limitations mentioned above. Although variable by type of data set, data sets all have a limit to the number of extents (contiguous groups of tracks) permissible on a single volume. A merge/migrate solution therefore must recognize that extents for multi-volume data sets may need to be combined, again requiring an awareness of volume contents.

A solution must also satisfy the requirement that all data sets belonging to one or more applications be copied at a single point-in-time, or with data "consistency."

In the prior art, volume-oriented (or "volume level") mirroring, or "fast replicate" mechanisms are known that copy complete volumes with little or no impact on applications. These "brute force" utilities simply copy all tracks of the volume without consideration of volume contents. Thus they do not address a volume merge/migrate scenario. Data set level fast replicate mechanisms exist that satisfy the merge/migrate meta-data requirements and remove all or most of the physical copy time from an application, but they can require a longer than desirable application down time window due to relatively long target data set allocation and re-cataloging times.

Mirroring and Fast Replicate mechanisms that rely on hardware/microcode solutions restrict the migration of data to devices of a common manufacturer. A flexible solution should allow source and target volumes to reside on standard DASD devices regardless of their manufacturer.

Hardware Volume Oriented Mirroring Methodologies.

Volume level mirroring methodologies utilizing hardware/microcode features exist. Prior art includes IBM PPRC and XRC, HDS ShadowImage, and EMC TimeFinder and SRDF. These methodologies do not satisfy the requirements for a volume merge/migrate for two reasons: they require copying tracks to the same target cylinder/track address as the source address, and they are unaware of the data sets and meta-data files contained on the volumes being copied. These mechanisms will not support a merge/migrate scenario where movement must occur across DASD devices of different manufacturers.

"Soft" Volume Oriented Mirroring Methodologies.

The term "soft" is used to describe existing mirroring mechanisms that do not rely on hardware or microcode in the solution. Equivalent functionality is achieved with software running in MVS address spaces. These include Softek/Fujitsu's TDMF and Innovation's FDR/PAS. Soft volume oriented mirroring mechanisms share the same inadequacies as hardware volume oriented mirroring as discussed above (save the ability to mirror across different manufacturers' devices).

Cylinder/Track Translate Tables for Data Set Level Copies.

A cylinder/track translate table is the heart of any copy mechanism with the capability to copy data set extents to different target cylinder/track locations, and/or if extent sizes differ between the source and target data sets. Prior art includes IBM's utility programs IEBGENER, IEBCOPY, IEHMOVE. However, these track translate tables are usually established only initially, in keeping with the point-in-time ("PIT") of conventional data set level copies being defined at the initiation of the copy process.

Where data sets are being mirrored as opposed to complete volumes, the status of data sets can change between establishing the mirrors and splitting off the targets. The nature of status differences can be categorized two ways: a) an extent allocation change to a data set remaining in the list of data sets to be mirrored and b) data sets added to or removed from the list of data sets to be mirrored.

Extent changes to data sets included in the mirroring process:
 a) Data sets that increase in size such that new source extents are acquired during the mirroring window
 b) Portions of or entire extents that are released (returned as free space) during the mirroring window Data sets added to or removed from the list of data sets to be mirrored:
 a) New data sets created after the mirrors are established but before the close window
 b) Data sets removed after the mirrors are established but before the close window. This can included deleted data sets, data sets removed from volumes due to migration, and renamed data sets. (Typically, renamed data sets are not actually recognized; the old data set name is considered removed and the new data set name is treated as an added data set.) All of these potential scenarios complicate the merge/migrate requirements.

SUMMARY OF THE INVENTION

One important aspect of the invention can be described as a "data set level mirroring methodology" meaning that DASD mirrors are established by data set, followed by mirror "splits" enabling the target data sets of the mirror to be accessed. In keeping with the concept that the split time of a mirror is the logical point-in-time of the "copy," the invention accommodates changes to data set allocations between the time mirrors are initiated and the splitting of target datasets.

Device independence (source and target devices may be from different manufacturers) is achieved by using a "soft" mirroring methodology, i.e., no hardware/microcode mechanisms are required.

One example of a method for merge migrating selected data sets under the DASD space management control of MVS operating systems from one or more source DASD devices or "volumes" to one or more target DASD devices or "volumes," in accordance with the present invention, generally comprises the steps of:
 a) assessing the source data sets to be migrated, the volumes they reside on, and the space they occupy;
 b) allocating space for corresponding target data sets using total source space as the a primary allocation request and using the original source data set names;
 c) constructing a cylinder/track translate table that correlates the source data set extent locations to target locations;
 d) starting monitor programs on every image that have the capability to write to any of the source volumes containing data sets being migrated;
 e) starting a program that copies data in accordance with a cylinder/track translate table;
 f) periodically re-synchronizing source and target tracks detected by the monitor programs;
 g) signaling applications that a close of data sets is necessary;
 h) recognizing that data sets are closed;
 i) final re-synchronizing source and target tracks;
 j) accommodating allocation differences since the initial assessment of data sets to be migrated;
 k) changing catalog entries to reflect new target data set volumes; and l) signaling application(s) that target data sets may be opened.

Because the cylinder/track translate table is established based on the initial assessment of data set extent information, tracks may be copied and kept in synchronization that are in fact erroneous due to changes in data set allocation as described above. In a presently preferred embodiment, these anomalies are detected and corrected during the "close" window of the process. Detection of entire data sets added to or removed from the desired list is accomplished by scanning either the catalog(s) or source volume(s), depending on whether the process is initially driven as a catalog versus volume centric process, and comparing the list of qualifying data sets to the list initial constructed.

Detection of extent changes to data sets still qualifying at the beginning of the "close" window is accomplished by collecting volume information from the catalog and VTOC information from the volumes and comparing this to the meta-data originally used to construct the cylinder/track translate table.

Additional aspects and advantages of this invention will be apparent from the following detailed description of preferred embodiments, which proceeds with reference to the accompanying drawings.

BRIEF DESCRIPTION OF THE DRAWINGS

FIG. 2 depicts a sample of data set and meta-data placement on source and target volumes and how a track translate table controls copying of data.

DETAILED DESCRIPTION OF PREFERRED EMBODIMENTS

Figure 1:
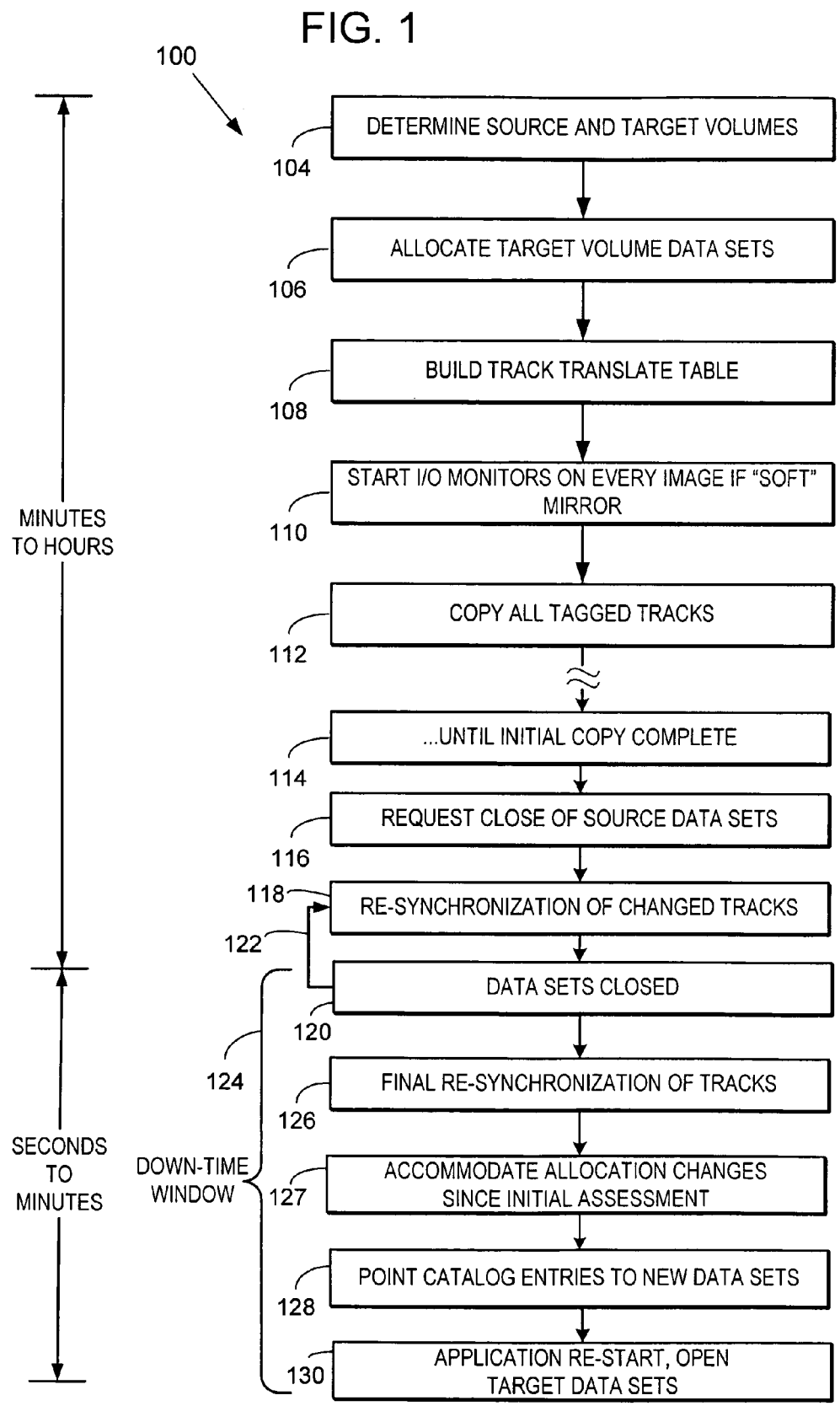
FIG. 1 is a time line depicting a method of data set level soft mirroring in accordance with the present invention. It illustrates the total time from initiation of the process to availability of target data sets. Down-time is defined as the time between closing and re-opening of application data sets.

To satisfy the primary object of minimizing application down-time for a volume merge or combining of data set extents, while still complying with the various constraints and requirements mentioned above, we have determined that embodiments of the invention preferably include the following characteristics or features:

a) allocation of initial target data set extents outside the down-time window b) initial copying of tracks outside the down-time window c) accommodating extents allocated after the initial mirror is established d) accommodating data sets desired in the merge/migrate but allocated after the initiation of the process e) accommodating data sets initially included but deleted or renamed during the process f) fast cataloging of target data sets For some embodiments, it may be useful to add and monitor additional volumes after the initiation of the process, which could occur from data sets extending into volumes not initially included, or new data sets partially or wholly contained on volumes not initially included.

The process 100 illustrated in FIG. 1, from initiation to initial synchronization could be minutes to hours depending on the number of volumes involved and the number of data sets involved. The double slashes in the time line are meant to illustrate the copy process will be relatively longer than the graphic depiction allows. That said, the time line is not intended to be to scale.

The re-synchronization loop while waiting for application(s) to close data sets could be seconds to hours, depending on where a user would prefer the copy process to occur relative to normal application activity, preferably with due consideration of DASD contention. However, the illustrated embodiment (FIG. 1) may make starting the process excessively in advance of the desired down-time window undesirable. The down-time window duration should be seconds to minutes depending on a number of factors discussed below.

In general, aspects of the present invention will be embodied in a software program or utility we will call an implementation or a solution. FIG. 1 is a time line depicting when the tasks involved in the data set level mirroring process are performed relative to the down-time window of the application. The time line is read top to bottom representing the total time from initiation of the process to availability of target data sets (again, not to scale). The implementation depicted by FIG. 1 may require a longer application down-time requirement than some alternative embodiments but it can be implemented for mirroring mechanisms where the cylinder/track translate table cannot be practically modified once constructed.

In FIG. 1, the first step 104 calls for determining or identifying source and target volumes. The implementation will typically allow a user to specify data to be migrated either by volume(s) or data set(s). If the process is data set centric, i.e., the user identifies source data set names/masks, the embodiment determines the source volumes involved by scanning MVS catalogs for matching names, and from catalog "volume cells" determines the scope of volumes involved. If the process is volume centric, i.e., the user identifies source volumes, the embodiment scans source volume VTOCs to determine the source data sets to be copied. System macros to access the VTOCs are well known. See, e.g., OS/390 V2R10.0 DFSMSdfp Advanced Services, Chapter 1—Using the Volume Table of Contents (IBM Corporation 2000).

In either case, the solution preferably also includes checking to ensure all data sets are wholly contained within the specified or implied source volumes. This validation step (not shown) also includes verifying that data sets with related components, such as VSAM spheres, are wholly contained within the volumes from which mirroring will be enabled. Available target volumes are specified by the user, either explicitly or through a default/setup procedure.

Next, step 106 calls for allocating the target volume data sets. For each data set to be migrated, the solution gathers extent information from VTOC records (in the source volume(s)) to assess the total amount of space currently allocated. For allocation of the corresponding target data set, the primary space request is the total space allocated for the source data set, and the secondary space request matches the source data set secondary space request currently in effect. Avoiding the possibility of exceeding maximum extents per volume is critical to merging volumes; potential violations can be detected and accommodated at this stage Target data set allocation preferably is accomplished without cataloging, hence allowing target data set names to be the same as source data set names. This contributes to the faster "cataloging" process explained later in the procedure. Allocation without cataloging can be accomplished by using MVS facility IEFSSREQ pointing to an SSOB pointing to an SSIB and SSSA with an SSSA type request decimal 14.

Because in a mirror/split scenario, the point-in-time of the logical copy is at the end of the physical copy process, the recognition and ability to allocate additional data set extents for a data set that extends during the physical copy process is crucial. This is described below.

Step 108 is building a cylinder/track translate table. The extents of source data sets are used in combination with the extents of corresponding target data sets to create the track translate table entries. In a presently preferred embodiment, a single track translate table entry represents a contiguous group of source tracks that correspond to a contiguous group of target tracks. A single source extent can result in multiple track translate table entries if the target allocation causes one or more breaks in the source extent. In conjunction with building a cylinder/track translate table, data set name and allocation information is saved for later comparison when the meta-data is collected again to discover differences between the initial assessment and the status at the start of the down time window.

A detailed example of a cylinder/track translate table in accordance with the invention is described next with reference to FIG. 2. In FIG. 2, first and second source volumes 300, 302 are illustrated. Data Sets "A," "B," and "C," each consisting of various extents stored in the source volumes are shown. For example, Data Set "C" has a first extent 310 on volume 302. Accordingly, the VTOC on volume 302 includes an entry for Data Set "C." Data Set "A" has extents on both volumes.

Referring again to FIG. 2, a target volume 304 is illustrated, as well as a cylinder/track translate table 306. Table 306 comprises a series of entries, for example entries 318, 320. Each entry comprises a source data set extent, identified by source volume, cylinder(s) and track(s), and a target or destination location defined by target volume, cylinder(s) and track(s). For example, source Data Set "A" has a first extent on source volume 300 (beginning at cylinder 578, track 0, and extending through cylinder 604, track 14, as illustrated). This source extent information forms the first part of table entry 318 as indicated by the arrow on the drawing. The second extent of Data Set "A" is similarly identified in another entry 322. And the third extent of Data Set "A," found on volume 302, is also entered in the table, entry 320. Actual data is not entered into the table. Rather, it identifies the source location and size of the extent to be copied. The extent information can be gathered from the source volume VTOC's.

Returning now to the time line of FIG. 1, after allocating target volume data sets 106, and building the track translate table 108, the method calls for starting software I/O monitors 110 on every image that can possibly alter a source volume. This step applies to "soft" mirroring mechanisms that detect alterations to source volume tracks during the process with MVS address space code as opposed to a hardware/microcode solution.

Prior art methodologies exist to monitor activity against entire volumes. However, in accordance with the present invention, it is necessary (and preferable) to monitor only those tracks on a source volume identified by the track translate table. Detection of track changes can be accomplished by inserting a routine at a low enough level in the MVS I/O process such that any write of a track is sensed. When a modified source track is detected, if the track has already been copied by the sequential copy process, the corresponding track translate table entry is flagged for subsequent copy by the re-synchronization task 118 described below.

Next, the process 100 begins copying of all tagged tracks, step 112; this is the initial copy step. Prior art methodologies are known for both soft and hard mirroring to sequentially copy all tracks of a volume, in a one for one track address relationship between source and target tracks. The present invention calls for copying only those tracks identified by track translate table. And the present methodology calls for copying according to the source and target cylinder/track addresses indicated in the table, which may and often will result in portions of source data sets being copied to multiple or fewer volumes, and to dissimilar absolute cylinder/track addresses.

The initial copying step continues until completed, indicated at 114. At this point, all source data set tracks initially identified have been copied to the allocated target volume(s). In prior art solutions, this occurs when all tracks of a volume have been copied. Again, according to the present invention, the initial copy step is defined to include only those tracks identified by the track translate table.

At Least One Re-Synchronization Per Volume.

Re-synchronization is the process of copying again any source tracks modified after the initial copy or after the last re-synchronization. At least one re-synchronization is desirable per volume, before inviting the closure of data sets, to minimize the time for the final re-synchronization performed during the application down-time. This initial or preliminary re-synchronization step is not shown in the drawing. The next step is to request close of data sets 116 (split could be accomplished). Splitting a mirroring relationship is also known as "breaking" the relationship. Prior art methodologies are known for signaling that the initial synchronization of a mirror has been achieved. In accordance with the present invention, re-synchronization signaling applies not to entire volumes, but only to those data sets where a mirror is requested.

The next step 118 is re-synchronization of changed tracks—referring here to tracks identified in the table and flagged as having changed. To minimize the time for the final re-synchronization performed after data sets are closed, a periodic re-synchronization is performed to keep the synchronicity of the source and target data sets as close as possible during the window where the process is waiting for user response to the invitation to close data sets. This periodic re-synchronization is indicated by loop 122 in the drawing, continuing up to the time the data sets are closed 120.

The concept of closing of data sets to ensure buffers are flushed and catalog entry statistics are in synchrony is prior art. The mechanisms for the signal are also known. This event defines the start of the "down-time" window 124.

Final Re-Synchronization of Tracks.

In response to the signal indicating that source data sets are closed, the present method executes a final re-synchronization 126.

As noted above, it is still necessary to accommodate allocation changes 127, e.g., new extents, space released, new data sets, and data sets renamed or deleted. Toward that end, meta-data is re-examined to determine additional extents allocated for data sets initially mirrored, space released for data sets initially mirrored, new data sets introduced after the initiation of the process, and data sets deleted or renamed since the initiation of the process. The meta-data re-examined comprises catalog(s), VTOC's, and VVDSes. Differences are detected by comparing current meta-data to the meta-data save at the time the cylinder/track translate table was originally constructed.

The comparison of before and after catalog and volume meta-data must be accomplished quickly. This implies handling as much if not all data in memory by taking advantage of MVS facilities such as data spaces, and using a fast comparison methodology such as a match merge with corresponding fast sorting of each list or a "keyed" lookup methodology based on a prior art solution use as a Red-Black tree structure.

Freeing volume space for space released and deleted data sets must occur first to ensure that subsequent allocation for additional extents and/or new data sets will succeed. This is to ensure that necessary space will indeed by found for scenarios where at the point-in-time of the mirror splits the target volumes could be full or nearly full.

Target data sets are allocated as empty data sets. This implies that anomalies would exist if not corrected for data elements such as the end-of-file pointers for non-VSAM data sets and VSAM data set values such as the High Used RBA, High Allocated RBA, and numerous VSAM statistics. Because the VTOC and VVDS are not mirrored, the source volume meta-data collected during the down time window is used to set fields in the corresponding target volume VTOCs and VVDSes.

Copying of the extensions is accomplished with implementation EXCP level code as opposed to conventional utilities. Newly introduced data sets since the initiation of the process may be allocated, copied, and cataloged with conventional utilities invoked from within the embodiment code.

Renamed data sets are accommodated by a direct change to volume meta-data files. Cataloging for renamed data sets is accomplished in the same fashion as data sets initially mirrored.

Allocation of space for extensions to data sets since the initial allocation is accomplished using MVS facility IEFSSREQ or by manipulating VTOC, VTOC Index, and VVDS records in accordance with DASD Management meta-data constructs. Volumes used by a data set are known by examining catalog (BCS) volumes cells and space used by a data set is known by examining VTOC DSCB type 1 and 3 records. Other intervening data set changes can be accommodated as follows:

Space released:
a) If space is released from source volume data sets for data sets still qualifying for the process, corresponding target volume space is released, either portions of an extent or entire extents.
b) If space is released from source volumes because a data set has been removed, all corresponding target volume space is released.

Data Sets Added:
For any data set not present at the initiation of the mirroring process, but qualifying by the start of the "close" window, corresponding target space is allocated and tracks are copied using conventional EXCP level I/O programming driven by a one-time cylinder/track translate table constructed for the extent locations of the source and target data sets. As with data sets allocated at the start of the mirroring process, target volume data sets are defined with their source volume data set names. Larger data sets are allocated first to avoid allocation failures due to fragmentation caused by deletion of entire data sets or releasing of space.

Point Catalog Entries to Target Data Sets.
The next step of the mirroring process, still within the down-time window 124, is to alter catalog entries 128. The preferred embodiment is to directly alter catalog records by updating affected record "cells," as opposed to utilizing MVS cataloging facilities. The aforementioned advantage of allocating "new" data sets using the source names relates to the key structure of MVS catalogs. The key of an MVS catalog record contains the data set name. Were the target data sets to be allocated with a different name, hence requiring a rename back to the original name, the cataloging process would be lengthened due to the requirement for VSAM data sets (structure of the catalog) that a key can only be changed by deleting the existing record and writing a new record.

Persistent Data Sets:
The term "persistent data set" refers to situations where a given data set is present at the time of the initial assessment of data sets to be mirrored, and it is present when meta-data is re-examined at the start of the down time window, but the data set may have been deleted and re-allocated during the mirroring window. These situations include:
a) a data set renamed where the "old" name is used in a new allocation
b) a data set deleted and a new data set allocated using the same name
c) a data set migrated but was subsequently recalled.

A persistent data set could be allocated on the same original volumes and with the same extents, hence not invalidating the mirroring that occurs. However, should a persistent data set be allocated on different source volume(s) and/or with different extent locations, this must be recognized and dealt with.

Recognition that tracks copied for a persistent data set are invalid is accomplished by comparing all extents from the initial meta-data collection against extents collected at the start of the down time window. Any differences, other than those that indicate space was simply released, imply that a persistent data set situation has occurred and the mirrored tracks are incorrect. This anomaly is corrected by deleting target space, reallocating target space, and copying all tracks.

Allocating space for target data sets using the original data set names also negates any need to change VTOCs, VTOCIXes, and VVDSes. Directly altering catalog volume cell contents by reading and re-writing catalog records must include catalog buffer invalidation, both with or without ECS in effect, in accordance with prior art solutions. To minimize the down time window this is a preferred solution over a requirement that catalogs be closed and unallocated.

A feature of the invention is using the same location information obtained in the allocation of target data sets to alter catalog records, thereby obviating the need to fetch the information from the target volume VTOCs. Finally, the down-time window concludes with Application re-start, and opening target data sets 130. This event defines the end of the down-time window.

We can envision a possible alternative embodiment in which some of the work necessary to accommodate data set allocation changes occurs during the mirror window, i.e., before the down-time begins, potentially resulting in even shorter down time. This will require that the cylinder/track translate table 306 be modifiable dynamically after being initially constructed.

A periodic comparison of current data set status and allocation information is performed against the initial meta-data saved when the cylinder/track translate table was initially constructed, or against the updated information resulting from a prior comparison. When space is freed from an arbitrary release of space or because a data set is deleted, the associated target space is freed and the corresponding cylinder/track translate table entries are negated. When new source volume extents are allocated for either initially mirrored data sets allocating more space, or the allocations for a new data, corresponding target data set space is allocated and associated cylinder/track translate table entries are added.

If the rename of a data set being mirrored is detected, previously created target volume meta-data file entries are altered as is the data set name associated with existing cylinder/track translate table entries.

Events involving release of target space are processed before events needing additional target space allocation to accommodate situations where target space could only be available by recognizing deletions.

Referring again to FIG. 2, we illustrated the case in which source Data Set "A" is in multiple extents and spans multiple volumes, specifically, source volumes 300 and 302. Target Data Set "A" depicts allocation of the entire data set in a single extent where possible. Because extents are by definition a contiguous group or tracks, if a source extent can be wholly copied to a target extent, one track translate table is required. The invention allows however for a source extent to be split if the target allocation results in multiple volumes being used.

Source Data Set "B" represents the scenario where an extent is allocated after the initial building of the track translate table—extent 2 shown in italics and dashed-line boxes.

It will be obvious to those having skill in the art that many changes may be made to the details of the above-described embodiments without departing from the underlying principles of the invention. The scope of the present invention should, therefore, be determined only by the following claims.

The invention claimed is:

1. A method for combining extents of a source data set, with minimal down time imposed on applications accessing the source data set, the source data set having a corresponding name, source DASD device(s) and one or more extent locations on the source DASD device(s), the method comprising the steps of:
   a) assessing the source data set to be migrated, the volume(s) it resides on, and the total space it occupies;
   b) allocating space for a corresponding target data set using the total source space as a primary allocation request and using the original source data set name;
   c) designating one or more target locations in the allocated space and assigning each source data set extent location to a respective one or more of the designated target locations;
   d) starting monitor programs on any images that can write to any of the identified source volumes in order to detect a subsequent change to the source data set;
   e) storing an indication of each source data set track detected by a monitor program as having changed;
   f) begin copying the source data set in accordance with said assignment of each source data set extent so as to form the corresponding target data set;
   g) while copying the source data set, periodically re-synchronizing source and target tracks detected by the monitor programs as having changed after having been previously copied;
   h) upon substantial completion of said copying, signaling an operator that closing the source data set is requested;
   i) recognizing that the source data set is closed thereby commencing a down time window;
   j) during the downtime window, finally re-synchronizing the source and target tracks detected by the monitor programs as having changed after having been previously copied;
   k) during the downtime window, accommodating any allocation changes affecting the source data set that occurred since the initial assessment of the source data set;
   l) changing catalog entries to reflect new target data set volumes; and
   m) signaling a user that the target data set may be opened, thereby terminating the down time window.

2. A method according to claim 1 wherein said designating one or more target locations in the allocated space and assigning each source data set extent to a respective target location includes constructing a cylinder/track translate table having an entry for each extent of the source data set.

3. A method according to claim 1 wherein said accommodating allocation differences includes detecting and accommodating a persistent data set.

4. A method according to claim 1 wherein said accommodating allocation differences includes detecting and accommodating a new source data set added during the mirroring process.

5. A method according to claim 1 wherein said accommodating allocation differences includes detecting and accommodating a source data set deleted during the mirroring process.

6. A method according to claim 1 wherein said accommodating allocation differences includes detecting and accommodating extent changes to data sets included in the mirroring process.

7. A method for data set-level mirroring of a selected source data set while minimizing downtime of applications accessing the source data set, the method comprising:
   identifying extents allocated to the source data set, each extent comprising a set of at least one DASD track;
   allocating within a target data set at least a number of extents needed to store the identified extents of the source data set;
   copying each track of an extent of the source data set to an extent of the target data set;
   in response to any tracks of the source data set being changed by an application during the copying step, recopying the changed tracks from the source data set to the target data set;
   commencing a downtime window in which applications may no longer access the source data set; and
   in response to an allocation change being made to the source data set since the allocating step, performing a corresponding allocation change to the target data set during the down-time window.

8. The method of claim 7, wherein allocating comprises assigning each extent of the source data set to a respective extent of the target data set.

9. The method of claim 8, wherein assigning comprises constructing a cylinder/track translate table having an entry for each extent of the source data set that points to the respective extent of the target data set.

10. The method of claim 9, further comprising flagging an entry of the cylinder/track translate table when a track of a corresponding extent of the source data set has been changed.

11. The method of claim 10, wherein recopying the changed tracks comprises recopying each track having a flagged entry in the cylinder/track translate table.

12. The method of claim 7, wherein the source data set has a name, and wherein identifying comprises:
    identifying within a catalog a data set having a matching name; and
    determining from the catalog one or more volumes used by the identified data set.

13. The method of claim 12, wherein identifying extents comprises gathering extent information from at least one Volume Table of Contents (VTOC) for the one or more volumes.

14. The method of claim 12, wherein allocating comprises allocating the extents for the target data set without cataloging such that the target data set and the source data set may have the same name.

15. The method of claim 7, wherein allocating comprises storing meta-data relating to the source data set, and wherein performing an allocation change comprises determining that an allocation change has been made to the source data set by comparing the stored meta-data with current meta-data for the source data set.

16. The method of claim 15, wherein the meta-data comprises at least one of a catalog, a Volume Table of Contents (VTOC), and a VVDS (VSAM Volume Data Set).

17. The method of claim 7, wherein performing an allocation change comprises allocating one or more additional extents within the target data set for any new extents added to the source data set after the allocating step.

18. The method of claim 17, further comprising copying each track of a new extent of the source data set to one of the additional allocated extents of the target data set.

19. The method of claim 7, wherein performing an allocation change comprises deleting extents within the target data set in response to a corresponding extent within the source data set being deleted after the allocating step.

20. The method of claim 19, wherein deleting extents comprises freeing volume space for deleted extents.

21. The method of claim 7, wherein performing an allocation change comprises renaming the target data set in response to the source data set being renamed after the allocating step.

22. The method of claim 7, wherein commencing a downtime window comprises closing the source data set.

23. The method of claim 7, wherein commencing a downtime window comprises notifying one or more application programs that the source data set is to be closed.

24. The method of claim 7, further comprising initiating a process for monitoring for changes to the tracks prior to the step of copying the tracks.

25. The method of claim 7, wherein recopying comprises periodically recopying changed tracks from the source data set to the target data set.

26. The method of claim 7, further comprising recopying any changed tracks from the source data set to the target data set after the downtime window has commenced.

27. A computer-readable medium storing computer-readable program code for performing a method for data set-level mirroring of a source data set while minimizing downtime of applications accessing the source data set, the stored computer program code comprising:
    computer-readable program code for identifying extents belonging to the source data set, each extent comprising a set of tracks;
    computer-readable program code for allocating within a target data set at least a number of extents needed to store the identified extents of the source data set;
    computer-readable program code for copying each track of an extent of the source data set to an extent of the target data set;
    computer-readable program code for in response to any tracks of the source data set being changed by an application during the copying step, recopying the changed tracks from the source data set to the target data set;
    computer-readable program code for commencing a downtime window in which applications may no longer access the source data set; and
    computer-readable program code for performing an allocation change to the target data set in response to an allocation change being made to the source data set since the initial allocating step.

28. The computer-readable medium storing computer-readable program code of claim 27, wherein the computer-readable program code for allocating comprises program code for assigning each extent of the source data set to a respective extent of the target data set.

29. The computer-readable medium storing computer-readable program code of claim 28, wherein the computer-readable program code for assigning comprises computer-readable program code for constructing a cylinder/track translate table having an entry for each extent of the source data set that points to the respective extent of the target data set.

30. The computer-readable medium storing computer-readable program code of claim 29, further comprising computer-readable program code for flagging an entry of the cylinder/track translate table when a track of a corresponding extent of the source data set has been changed.

31. The computer-readable medium storing computer-readable program code of claim 30, wherein the computer-readable program code for recopying the changed tracks comprise computer-readable program code for recopying each track having a flagged entry in the cylinder/track translate table prior to commencing a downtime window.

32. The computer-readable medium storing computer-readable program code of claim 27, wherein the source data set has a name, and wherein the computer-readable program code for identifying comprise:
    computer-readable program code for identifying within a catalog a data set having a matching name; and
    computer-readable program code for determining from the catalog one or more volumes used by the identified data set.

33. The computer-readable medium storing computer-readable program code of claim 32, wherein the computer-readable program code for identifying extents comprise computer-readable program code for gathering extent information from at least one Volume Table of Contents (VTOC) for the one or more volumes.

34. The computer-readable medium storing computer-readable program code of claim 32, wherein the computer-readable program code for allocating comprise computer-readable program code for allocating the extents for the target data set without cataloging such that the target data set and the source data set may have the same name.

35. The computer-readable medium storing computer-readable program code of claim 27, wherein the computer-readable program code for allocating comprise computer-readable program code for storing meta-data relating to the source data set, and wherein the computer-readable program code for performing an allocation change comprise computer-readable program code for determining that an allocation change has been made to the source data set by comparing the stored meta-data with current meta-data for the source data set.

36. The computer-readable medium storing computer-readable program code of claim 35, wherein the meta-data comprise at least one of a catalog, a Volume Table of Contents (VTOC), and a VVDS (VSAM Volume Data Set).

37. The computer-readable medium storing computer-readable program code of claim 27, wherein the computer-readable program code for performing an allocation change comprise computer-readable program code for allocating one or more additional extents within the target data set for any new extents added to the source data set after the allocating step.

38. The computer-readable medium storing computer-readable program code of claim 37, further comprising computer-readable program code for copying each track of a new extent of the source data set to one of the additional allocated extents of the target data set.

39. The computer-readable medium storing computer-readable program code of claim 27, wherein the computer-readable program code for performing an allocation change comprise computer-readable program code for deleting extents within the target data set in response to a corresponding extent within the source data set being deleted after the allocating step.

40. The computer-readable medium storing computer-readable program code of claim 39, wherein the computer-readable program code for deleting extents comprise computer-readable program code for freeing volume space for deleted extents.

41. The computer-readable medium storing computer-readable program code of claim 27, wherein the computer-readable program code for performing an allocation change comprise computer-readable program code for renaming the target data set in response to the source data set being renamed after the allocating step.

42. The computer-readable medium storing computer-readable program code of claim 27, wherein the computer-readable program code for commencing a downtime window comprise computer-readable program code to first confirm closure of the source data set.

43. The computer-readable medium storing computer-readable program code of claim 27, wherein the computer-readable program code for commencing a downtime window comprise computer-readable program code for requesting that the source data set be closed.

44. The computer-readable medium storing computer-readable program code of claim 27, further comprising computer-readable program code for initiating a process for monitoring for changes to the tracks prior to the step of copying the tracks.

45. The computer-readable medium storing computer-readable program code of claim 27, wherein the computer-readable program code for recopying comprise computer-readable program code for periodically recopying changed tracks from the source data set to the target data set.

46. The computer-readable medium storing computer-readable program code of claim 27, further comprising computer-readable program code for recopying any changed tracks from the source data set to the target data set after the downtime window has commenced.

47. A method for data set-level migrating a selected source data set under a Multiple Virtual Storage (MVS) operating system while minimizing downtime of the source data set, the method comprising:

(a) assessing the source data set to be migrated so as to identify a set of source data set tracks on which the data set is stored;
(b) storing initial meta-data that reflects extent locations of the source data set tracks;
(c) initially allocating a target data set with at least sufficient space to store the source data set tracks;
(d) beginning sequential copying of only the source data set tracks to the target data set;
(e) while the sequential copying proceeds, beginning monitoring to detect any changes to a source data set track after the track was last sequentially copied, thereby identifying as a modified track one that requires re-copying;
(f) continuing the sequential copying of source data set tracks until all of the source data set tracks have been copied, and all modified tracks have been re-copied;
(g) after completion of the sequential copying, requesting that a user close and unallocate the source data set;
(h) continuing said monitoring to detect and identify any modified source data set tracks until the source data set has been closed and unallocated;
(i) while waiting for the source data set to be closed and unallocated, re-copying any identified modified track;
(j) responsive to an indication that the source data set has been closed and unallocated, effecting a final re-synchronization step by re-copying any modified track not yet re-copied;
(k) checking to detect any allocation change to the source data set since initially allocating the target data set, by comparing current meta-data describing the source data set to the initial meta-data stored at the beginning of the process;
(l) in response to detecting an allocation change having been made to the source data set after the target data set was initially allocated, adjusting the target data set to accommodate the allocation change;
(m) updating a corresponding catalog and system meta-data describing the source data set to point to the target data set; and then
(n) signaling release to open the target data set.

48. A method for data set-level migrating according to claim 47 wherein the detected allocation change to the source data set after initially allocating the target data set comprises an extension to the source data set, and said adjusting the target data set comprises, if necessary, extending the target data set so as to accommodate the source data set extension.

49. A method for data set-level migrating according to claim 47 wherein the detected allocation change to the source data set after initially allocating the target data set comprises a release of space in the source data set, and said adjusting the target data set comprises releasing corresponding space in the target data set.

50. A method for data set-level migrating according to claim 47 wherein the detected allocation change to the source data set after initially allocating the target data set indicates that the source data set was removed, and said adjusting the target data set comprises releasing all space initially allocated to the target data set.

51. A method for data set-level migrating according to claim 47 wherein the detected allocation change comprises allocation of a new source data set, and said adjusting the target data set comprises allocating target space for the new source data set and then copying the tracks comprising the new source data set to the corresponding target space.

52. A method for data set-level migrating according to claim 47 wherein said storing initial meta-data that reflects extent locations of the source data set tracks comprises storing a cylinder/track translate table.

53. A method for data set-level migrating according to claim 47 wherein said initially allocating a target data set includes using the source data set name as the allocated target data set name.

54. A method for data set-level migrating according to claim 47 wherein the said checking step to detect any allocation change to the source data set is effected after the final re-synchronization step.

55. A method for data set-level migrating according to claim 47 and further comprising effecting a preliminary re-synchronization by re-copying the modified tracks prior said requesting that the user close and unallocate the source data set.

* * * * *

UNITED STATES PATENT AND TRADEMARK OFFICE
CERTIFICATE OF CORRECTION

| | |
|---|---|
| PATENT NO. | : 7,146,475 B2 |
| APPLICATION NO. | : 10/717199 |
| DATED | : December 5, 2006 |
| INVENTOR(S) | : Robert M. Perego |

It is certified that error appears in the above-identified patent and that said Letters Patent is hereby corrected as shown below:

In Column 4, Line 16, replace "included" with --include--.

In Column 4, Line 48, delete "a ".

In Column 4, Line 63, replace "final" with --finally--.

In Column 5, Line 14, replace "initial" with --initially--.

In Column 5, Line 67, replace "double slashes" with --tildes--.

In Column 8, Line 6, after "by ", insert --the--.

In Column 8, Line 66, replace "save" with --saved--.

In Column 9, Line 3, delete "as ".

In Column 9, Line 7, replace "use" with --such--.

In Column 9, Line 12, replace "by" with --be--.

In Column 14, Line 36, replace "comprise" with --comprises--.

In Column 14, Line 42, replace "comprise" with --comprises--.

In Column 14, Line 51, replace "comprise" with --comprises--.

In Column 14, Line 57, replace "comprise" with --comprises--.

In Column 14, Line 63, replace "comprise" with --comprises--.

In Column 14, Line 66, replace "comprise" with --comprises--.

In Column 15, Line 6, replace "comprise" with --comprises--.

In Column 15, Line 12, replace "comprise" with --comprises--.

In Column 15, Line 24, replace "comprise" with --comprises--.

In Column 15, Line 30, replace "comprise" with --comprises--.

UNITED STATES PATENT AND TRADEMARK OFFICE
CERTIFICATE OF CORRECTION

PATENT NO. : 7,146,475 B2
APPLICATION NO. : 10/717199
DATED : December 5, 2006
INVENTOR(S) : Robert M. Perego It is certified that error appears in the above-identified patent and that said Letters Patent is hereby corrected as shown below:

In Column 15, Line 36, replace "comprise" with --comprises--.

In Column 15, Line 43, replace "comprise" with --comprises--.

In Column 15, Line 48, replace "comprise" with --comprises--.

In Column 15, Line 57, replace "comprise" with --comprises--.

In Column 18, Line 7, after "prior ", insert --to --.

Signed and Sealed this

Tenth Day of April, 2007

JON W. DUDAS
*Director of the United States Patent and Trademark Office*